United States Patent [19]
Schneider

[11] Patent Number: 5,668,777
[45] Date of Patent: Sep. 16, 1997

[54] TORPEDO SIGNAL PROCESSOR

[75] Inventor: Walter T. Schneider, Portsmouth, R.I.

[73] Assignee: The United States of America as represented by the Secretary of the Navy, Washington, D.C.

[21] Appl. No.: 687,064

[22] Filed: Jul. 8, 1996

[51] Int. Cl.$^6$ .............. G01J 15/66; F42B 19/00
[52] U.S. Cl. .............. 367/96; 367/103; 367/135; 114/20.1
[58] Field of Search .............. 367/96, 103, 105, 367/119, 122, 87, 135; 114/20.1, 21.3, 23; 364/423, 462, 516

[56] References Cited

U.S. PATENT DOCUMENTS

| | | | |
|---|---|---|---|
| 4,686,532 | 8/1987 | McAulay | 367/87 |
| 5,253,221 | 10/1993 | Coulbourn | 367/135 |
| 5,483,500 | 1/1996 | Capell, Sr. et al. | 367/119 |

*Primary Examiner*—Daniel T. Pihulic
*Attorney, Agent, or Firm*—Michael J. McGowan; William F. Eipert; Prithvi C. Lall

[57] ABSTRACT

An integrated torpedo sonar signal processor having an integrated analog-to-digital conversion component is provided. The torpedo sonar signal processor has four groups of low-pass filtered analog-to-digital converters, each group containing thirteen converters. The output of a group (thirteen converters) is a serial data signal which is outputted to a field programmable gate array which, in turn, converts the combined signal to parallel data word. The parallel data word is outputted to a first digital signal processor which in turn outputs to a second dual-port digital signal processor, the processor providing prefiltering and space-time processing. The output signal is then sent to a beamformer dual-port digital signal processor which has an attached external memory. The beamformer signal is then outputted to a signal processor component containing four dual-port digital signal processors and a common external memory. The entire torpedo sonar signal processor is controlled by a network controller which sequences the program downloads and system initialization. The network controller also provides a link to the torpedo's control processor over a field programmable gate array-based interface.

12 Claims, 6 Drawing Sheets

TORPEDO SIGNAL PROCESSOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to torpedo signal processors and more particularly to signal processors having integrated analog-to-digital converters with the digital signal processor.

(2) Description of the Prior Art

Current technologies for torpedo guidance systems use designs that typically contain custom, special purpose A/D converters which digitize analog voltages from each element of the torpedo's sonar array. The digitized outputs are such that sub sampling of the digital signal can be done without having to over sample the signal. This capability has been achieved at the expense of added components and complexity in the receiver system. The advantage gained was reduced computational requirements in the base banding digital signal processors and prefilter hardware logic, the disadvantage being added complexity in the analog receiver subsystem. Generation of these signals and the associated hardware have been the driving requirement in the basic design of digital signal processors for torpedo guidance.

Torpedo signal processor designs perform the following functions: prefiltering or base banding, beam forming and signal processing such as windowing, FFT's and matched filtering. The hardware required to do the overall torpedo signal processor functions currently takes six 6 by 9 circuit cards, not including the analog to digital conversion. Current signal processor technology uses a single processing element node that requires 12–14 IC's. These processing elements are used to implement the overall processor architecture. They include the DSP ICs, external memory, inter processor communications first in first out memories (FIFO's) status registers, control registers and transceivers. An advanced signal processor integrated circuit technology is needed which can reduce the required circuit board area dedicated to the processor. Additionally, an integrated processor is needed to reduce component counts, reduce power requirements, reduce cooling requirements, reduce weight and reduce size.

Several current signal processors are made using commercial off-the-shelf boards which can execute the required software, however, all suffer from many major drawbacks when used in torpedo applications. Because the commercial boards are designed for general purpose signal processing, they carry interfaces and special circuits that are not necessary for the torpedo mission. These interfaces and circuits include various standard buses such as the VME, VSB or other unique bus structures that are designed for general purpose applications. Although these circuits add flexibility for general purpose use, they also add cost due to extra IC's, connectors and power utilized.

SUMMARY OF THE INVENTION

Accordingly, it is an object of the present invention to provide a torpedo signal processor having an integrated analog-to-digital conversion with the digital signal processor.

It is a further object of the invention to provide a torpedo signal processor having a reduced number of components including external memory and reduced line drivers and receivers.

It is yet another object of the invention to provide a torpedo signal processor having reduced power requirements, reduced cooling requirements, reduced weight and reduced size.

In accordance with these and other objects, the invention is an integrated torpedo signal processor having four groups of multiple low-pass filtered analog-to-digital convertors, each group providing an input to a field programmable gate array and each field programmable gate array providing an input to a digital signal processor (DSP). Thereafter, the architecture provides output from pairs of the DSP's to a second level of DSP's for the prefiltering function. The output of the prefiltering DSP's is likewise combined in a beam-former digital signal processor having an external memory for storage of beam former data. The torpedo signal processor architecture provides direct throughput of processed data without the need for intermediate external memory or storage. The beam former data, however, is stored thereby allowing post processing of data such as the computation of new beams based on results of detections during the current sonar cycle. The architecture also supports advanced signal processing, such as space-time signal processing, provided by a second level of digital signal processors included between the first prefilter processors and the beam former processor.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
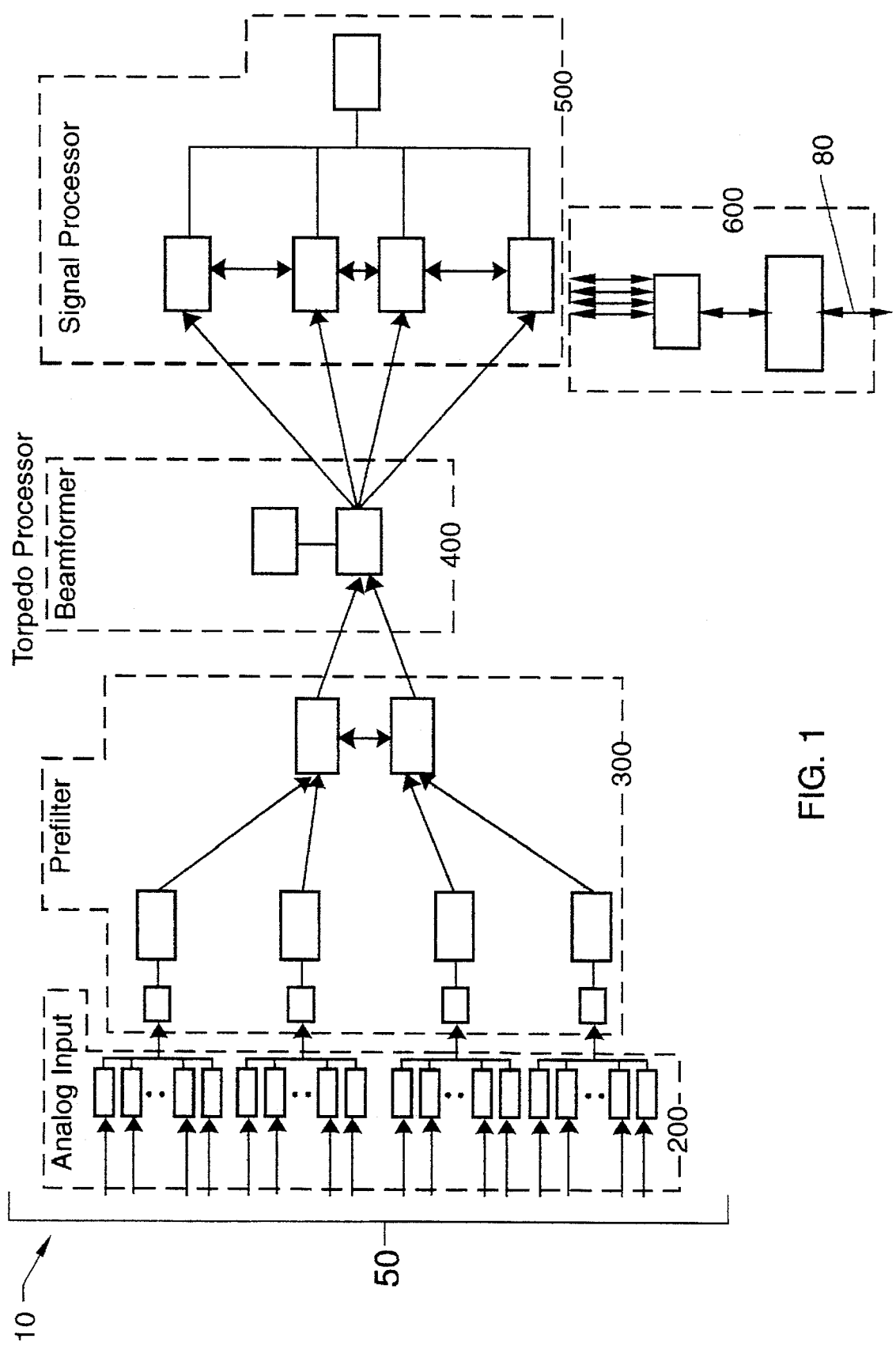
FIG. 1 is an overall block diagram of the architecture of the torpedo signal processor.

Referring now to FIG. 1, the torpedo sonar signal processor, designated generally by the reference numeral 10, is shown with is major components. These components include the analog input component 200, the prefilter component 300, the beamformer component 400, the signal processor component 500, and the network controller 600.

The analog input component 200 receives analog signals 50 (as depicted by arrows) from the preamp of a sonar array (not shown). The analog signals 50 are low-pass filtered and converted to digital signals in the analog input component 200. The design groups the output of several analog-to-digital (A/D) converters outputting the resulting signals to the prefilter component 300. The prefilter component 300 comprises a plurality of field programmable gate arrays which, in turn, provide direct input to a plurality of digital signal processors (DSP's) using only internal memory. The resulting signals are outputted to beamformer component 400 which, in turn, provides an output to the signal processor component 500. Program downloads and system initialization are controlled by a network controller 600 which also provides a link 80 to a torpedo's control processor.

Figure 2:
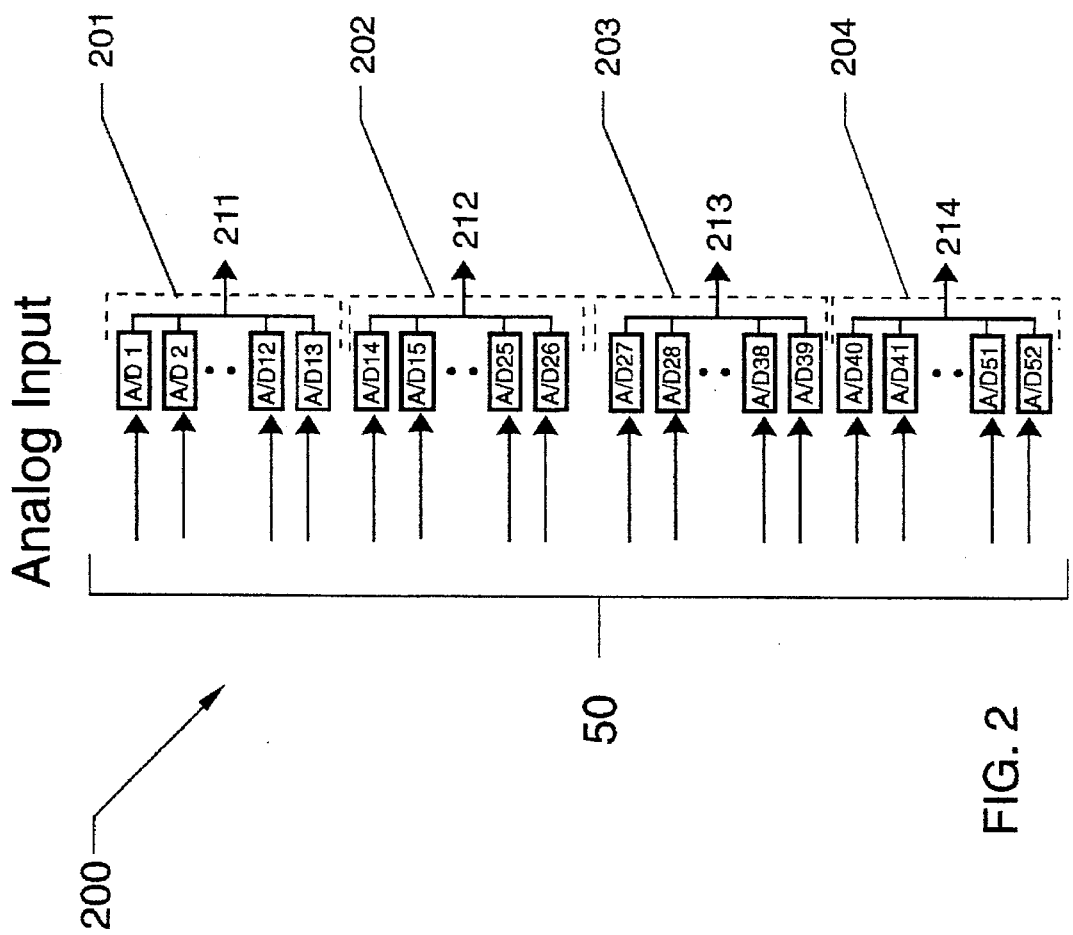
FIG. 2 is a detailed block diagram of the analog input section of the torpedo processor.

Referring now to FIG. 2, the details of the configuration of the input component 200 may be seen. Analog signals 50 are low-pass filtered by a plurality of analog-to-digital (A/D) converters, designated A/D 1 through 52. The A/D converters are arrayed in four groups, designated 201, 202, 203 and 204, respectively. In the preferred embodiment, thirteen A/D converters are contained in each group sampling a total of fifty-two individual 100 kHz 16-bit channels received from the preamp of a sonar array. Output signals from the A/D converter groups 201–204 provide data, frame synchronization and clock strobes, the output signals designated respectively by arrows 211, 212, 213 and 214.

Figure 3:
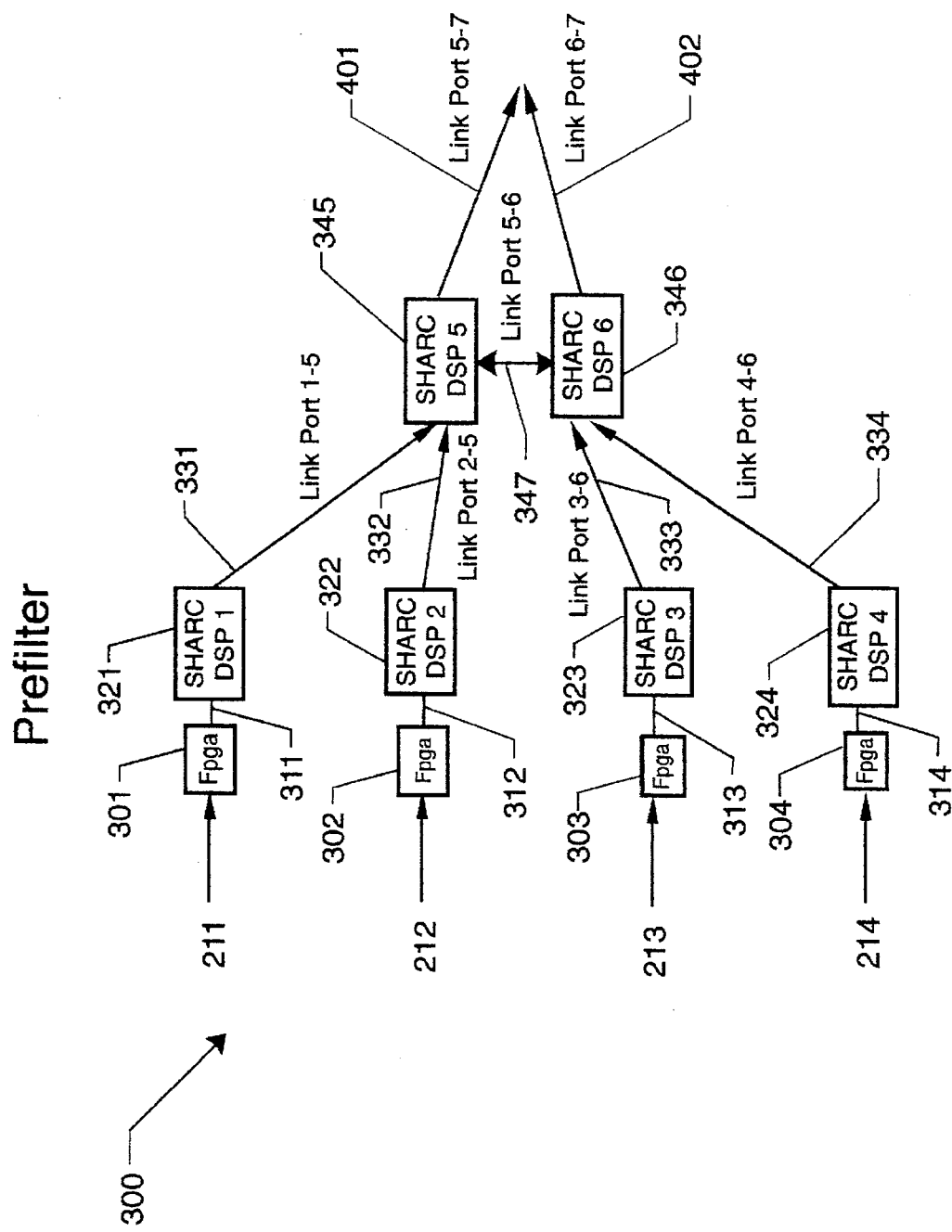
FIG. 3 is a detailed block diagram of the prefilter section of the torpedo processor.

With reference to FIG. 3, the output signals 211–214 are fed into single 10K field programmable gate arrays (FPGA's) 301, 302, 303 and 304, respectively. The field programmable gate arrays convert the signals to link port input data frames, depicted by links 311, 312, 313 and 314, respectively. This process results in a direct link into digital signal processors 321–324 without the necessity of using external first-in-first-out memory or programmed input-output (I/O) as the digital signal processor (ADSP 21060™ in the preferred embodiment) link supports access into the internal static random access memory (SRAM) of the DSP via the internal dual-port SRAM using direct memory access with program minimal execution impacts. The FPGA 301 receives data stream 211 as a serial input from thirteen A/D converters (as shown in FIG. 2) and converts the output 311 to a parallel data word. The FPGA 301 then takes the parallel data word, (using the internal SRAM of the FPGA as the FIFO) and buffers up a data block for transmission into the DSP 321. This process is accomplished by taking the FPGA output from internal FIFO circuits and converting it to the correct format for loading directly into DSP 321 via link port 311.

In the preferred embodiment, with each digital signal processor having 512K bytes of internal SRAM, the overall architecture provides more than 6.1 MBytes of internal memory thereby eliminating the necessity of using external memory except in the beamforming and signal processing function areas. The architecture of the preferred embodiment supports advanced signal processing such as space-time signal processing as additional digital signal processors 345 and 346, respectively are included between the first prefilter processors 321–324 and the beamformer processor 400. Using this architecture, 240 Mflops are provided that take data from each prefilter processor and provide a means to distribute and process the data prior to complete beamforming. This is shown in the figure as the link 347 between DSP's 5 and 6. Input to this function is the prefilter data outputs that arrive on link ports 1-5, 2-5, 3-6, and 4-6, designated as 331, 332, 333 and 334, respectively. Output from digital signal processors 345 and 346, designated by arrows 401 and 402 is sent to the beamformer component 400 (shown in FIG. 1).

Figure 4:
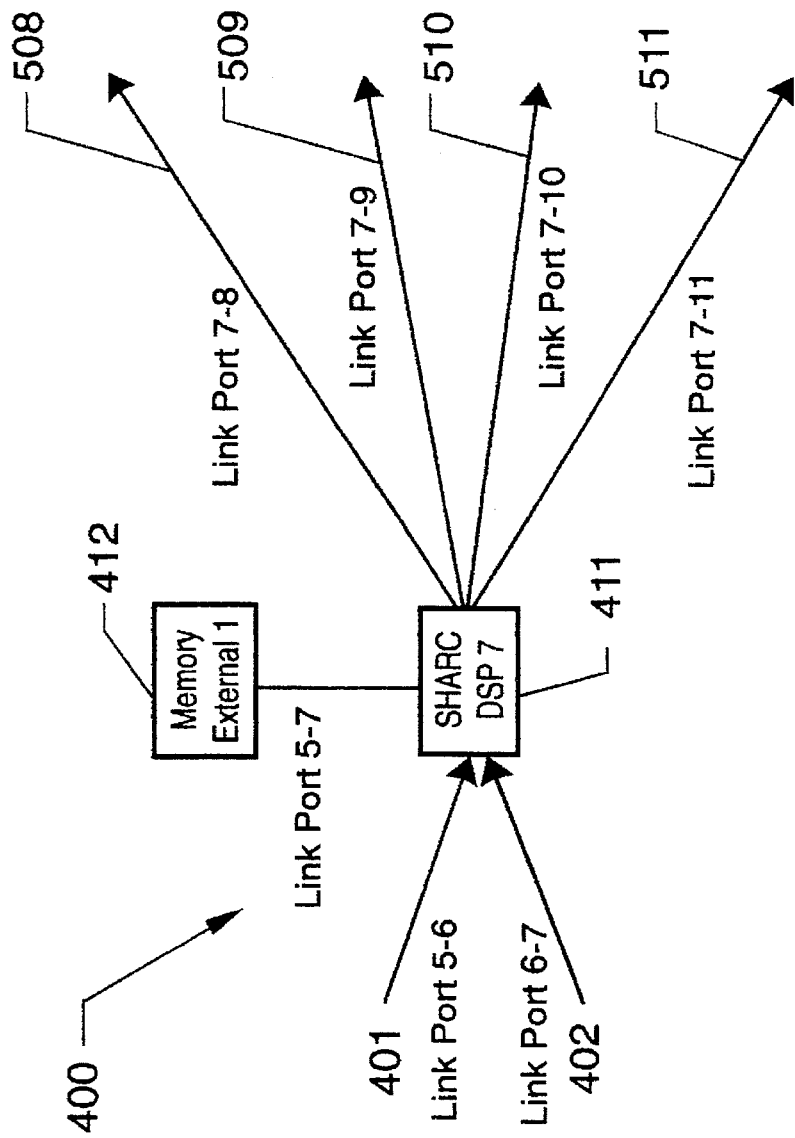
FIG. 4 is a detailed block diagram of the beamformer section of the torpedo processor.

Referring now to FIG. 4, the beamformer 400 receives data into digital signal processor 411 from the prefilter digital signal processors 345 and 346 via link ports 5-7 and 6-7 designated by reference numerals 401 and 402, respectively. It outputs data to the signal processor 500 (shown in FIG. 1) via link ports 7-8, 7-9, 7-10 and 7-11 designated as 508, 509, 510 and 511, respectively. Digital signal processor 411 has an external memory 412 for storing beamformer data. This memory 412 allows advanced operation including support for multiple boards and multiple detection schemes.

Figure 5:
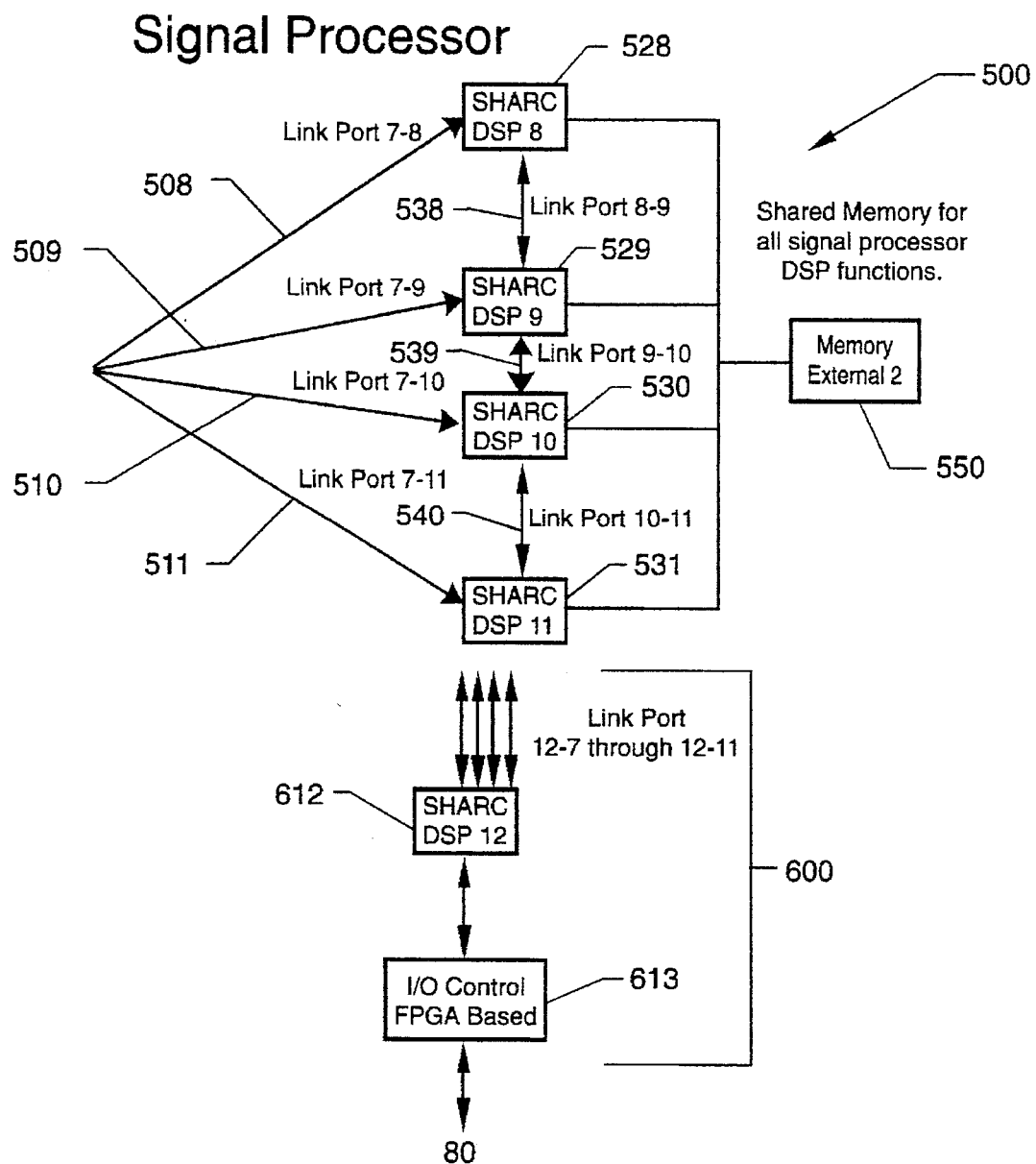
FIG. 5 is a detailed block diagram of the signal processor section of the torpedo processor.

Referring now to FIG. 5, the input signals 508, 509, 510 and 511 provide a data distribution into the individual digital signal processors within signal processor component 500. The architecture provides an equal distribution into each signal processor, each with internal DMA controllers in the beamformer DSP 411 (shown in FIG. 4) to allow transparent movement of data into each signal processor also without programmed I/O. The digital signal processors 528–531 share a common external memory 550 for all signal processor DSP functions and are linked via links 538, 539 and 540. Program downloads and system initialization is done using a single network controller 600. These procedures are accomplished by dual-port digital signal processor 612. Signal processor 612 can send control signals to digital signal processors 411 and 528–531 using link ports 12-7 through 12-11 or using similar conventional means. The network controller also provides a link 80 to a torpedo control processor over a FPGA-based interface link 613. This FPGA-based (I/O) controller 613 allows the system to interface with various host processors such as existing torpedo control processors, or, using a different configuration, commercial standard interfaces if necessary for debugging purposes.

Figure 6:
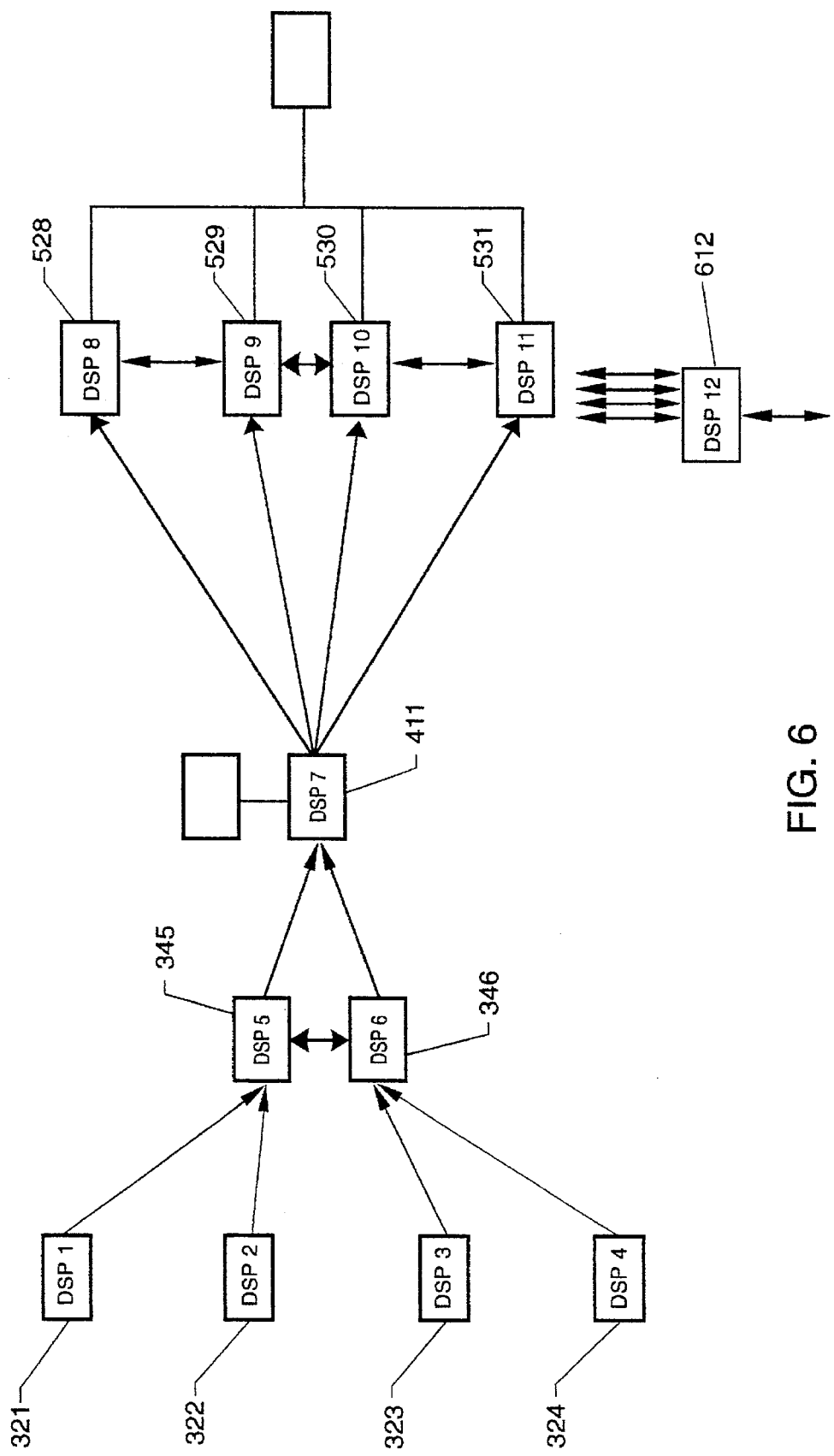
FIG. 6 is a schematic showing the downloading architecture of the torpedo processor.

Implementation of the architecture of the torpedo sonar signal processor may be seen by reference to FIG. 6. Processor downloads are done in a tree-like manner in which digital signal processor 612 sends control signals to download digital signal processors 8, 9, 10, and 11, (references 528, 529, 530 and 531, respectively). Digital signal processor 531 then downloads digital signal processor 411 which then downloads digital signal processors 345 and 346. Digital signal processors 345 downloads digital signal processor 321 and 322 and digital signal processor 346 downloads digital signal processors 323 and 324. This structure distributes the downloading in a series manner and supports flexible testing. Each stage in the network being loaded with code and data from the previous stage. Using this approach, the network does not require any boot proms or special DMA accessible external memory logic and this saves on component parts such as transceivers and external DMA controller logic.

Each FPGA in the system is set up so that it can be downloaded with it's internal logic configuration. Control paths and signals are not shown. This feature allows the design to be adaptable to various A/D converter changes in the interface that may take place over the life of the processor. These timing and interface differences can be accounted for by reprogramming of the FPGA's internal logic and by using downloadable SRAM based FPGA's such as the Xilinx XC4010 series parts.

The features and advantages of the present invention are numerous. The incorporation of analog-to-digital conversion circuits within the digital signal processor eliminates the need for external memory and the associated complexities in controlling first-in, first-out processing. In the present invention, the input circuits are incorporated into the signal processor function. The ADSP 21060 processor has a peak rating of 120 MFLOPS. This exceeds the prior art processor by a factor of over 4 on an digital signal processor to digital signal processor comparison basis. This design has a peak MFLOP rating of 1440 MFLOPS. In this design, the advantage is that beamforming that was previously spread over multiple processors, can now be handled by a single processor device. In advanced applications, multiple bands and multiple detection schemes are desired to be run in parallel, here, 480 MFLOPS is provided for signal processing functions. These are directly interfaced from the beamforming processor, which, by it's nature, requires data from each element. As a result of these features, the overall component count is reduced, production costs are reduced, and reliability is improved. Additionally, receiver interface components are eliminated, including line drives and receivers. The present invention provides digital signal processor resources for execution of space-time processing and provides a physical mapping of functional requirements including prefiltering, beamforming and signal processing into one or more specific digital signal processors. The key feature of the invention includes a special purpose torpedo sonar signal processor built using an integrated analog-to-digital processor and eliminating general purpose processor components, such as external cross-bar switches, VME interfaces and other standard interfaces. The invention includes four sets of analog-to-digital converters connected to field programmable gate arrays which are in turn connected to thirteen A/D converters. The field programmable gate arrays allow software control of the interfaces to the torpedo control processor. The prefiltering functions using this processor structure require no external memory circuits. The special purpose processor uses no custom integrated circuits, but is based on a combination (and-elimination) of commercially available integrated circuits thereby providing the functionality of a custom torpedo signal processor with the low cost of standard circuits.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A torpedo sonar signal processor comprising:
   an analog input component operating with only internal memory and receiving input signals from a sonar array;
   a prefilter component operating with only internal memory, said prefilter component attached to and receiving input signals from said analog input component;
   a beamformer component having an external memory, said beamformer attached to and receiving input signals from said prefilter component;
   a signal processor component having external memory, said signal processor component attached to and receiving input signals from said beamforming component; and
   a network controller component receiving input data signals from and sending control signals to said signal processor component and further providing output signals to a torpedo control processor.

2. A torpedo sonar signal processor as in claim 1 wherein said analog input component further comprises a plurality of groups containing a plurality of analog-to-digital converters.

3. A torpedo sonar signal processor as in claim 2 wherein each of said groups of analog-to-digital converters contains thirteen converters.

4. A torpedo sonar signal processor as in claim 2 wherein said prefilter component comprises a plurality of input elements, each containing a field programmable gate array followed in series by a first digital signal processor, each of said input elements receiving input from said plurality of analog-to-digital converters within a single group.

5. A torpedo sonar signal processor as in claim 4 wherein each of said field programmable gate arrays has a converter for converting the input signal from each analog-to-digital converter within a single group into a parallel data word which is transferred to said first digital signal processor within the input element.

6. A torpedo sonar signal processor as in claim 4 wherein a plurality of said input elements provides a space-time processed signal to a second digital signal processor.

7. A torpedo sonar signal processor as in claim 6 wherein said plurality of input elements comprises two input elements.

8. A torpedo sonar signal processor as in claim 1 wherein said beamformer component comprises a single digital signal processor having an external memory attached and an internal dual-port static random access memory supporting direct memory addressing.

9. A torpedo sonar signal processor as in claim 1 wherein said signal processor component comprises a plurality of dual-port digital signal processors sharing a common external memory.

10. A torpedo sonar signal processor as in claim 1 wherein said network controller comprises a dual-port digital signal processor connected to a field programmable gate array based controller having input-output buffer integrated circuits.

11. A torpedo sonar signal processor comprising:
    a plurality of low-pass, delta-sigma based sixteen-bit analog-to-digital converters, arrayed in groups, and receiving input from a pre-amplifier of a sonar array;
    a plurality of field programmable gate array 10K gates each attached to and receiving input from the sixteen-bit analog-to-digital converters in a single group;
    a plurality of first digital signal processors having only internal memory, each attached to and receiving input from one of said plurality of field programmable gate arrays;
    a plurality of second dual-port digital signal processors having only internal memory, each second digital signal processor attached to and receiving input from a pair of said first digital signal processors;
    a beamformer comprising a single dual-port digital signal processor having both an internal and a first external memory and attached to said plurality of second digital signal processors;
    a signal processor attached to and receiving input from said beamformer, said signal processor comprising four dual-port digital signal processors arranged in parallel, each of said digital signal processors having an internal memory and sharing a common second external memory; and
    a network controller comprising a single dual port digital signal processor attached to and providing two-way data flow through said signal processor.

12. A torpedo sonar signal processor as in claim 11 wherein the internal memory of each digital signal processor comprises a 512 kilobyte static random access memory.

* * * * *